May 4, 1937.  J. A. ZUBLIN  2,079,142

BEARING ASSEMBLY FOR DRILLING TOOLS

Filed Nov. 20, 1936

Inventor
John A. Zublin
By J. W. Rodgers
Attorney

Patented May 4, 1937

2,079,142

UNITED STATES PATENT OFFICE 2,079,142

BEARING ASSEMBLY FOR DRILLING TOOLS

John A. Zublin, Los Angeles, Calif.

Application November 20, 1936, Serial No. 111,871

14 Claims. (Cl. 255—71)

The present invention is concerned with bearings for heavily loaded rotating members such as are found especially in well drilling tools. One such tool is shown in my copending application, Serial No. 102,589, filed September 25, 1936 maturing into Patent No 2,069,799, granted February 9, 1937. My new bearing assembly for drilling tools may be applied not only to this type of bit, but to other types of drilling tools, and also to any other kind of machine wherein such a bearing is useful.

Two main types of bearings are at present in use, both of them being applied to drilling tools, namely, (a) journal type bearings, and (b) roller or ball type bearings. The journal type bearing has the advantage of being simple, sturdy and capable of standing great loads as long as this bearing is properly lubricated, but it has the disadvantage that inasmuch as the parts have frictional or rubbing contact it is hard to turn, and in the absence of proper lubrication and in the presence of sand or other abrasives usually found in a well it produces so much friction as to greatly hamper free movement. Furthermore, great wear takes place over the area of contact because of the presence of these abrasive particles which become lodged between the surfaces of contact of bearing and carrier.

Roller and ball type bearings have a rolling contact which is nearly non-frictional and are much easier to rotate even in the presence of sand or other abrasives and under poor lubricating conditions. However, these bearings consist of a large number of parts, and are consequently more complicated, more expensive, and in many cases non-repairable. These bearings are also more liable to break down under an excessive load such as that found on bearings in oil well drilling tools.

My invention consists of a bearing assembly which comprises the advantages of a journal type bearing with the advantages of a roller or ball type bearing, doing away with handicaps which are characteristic of each type of bearing as above described.

It is a general object of my invention to provide a combination bearing structure having a journal type bearing for its main support to absorb the biggest part of the working load, aided however by a ball or roller type bearing conveniently placed at either side of or spaced along the journal bearing, so that the carrier will turn freely and easily on the balls or rollers when it is under no or little load, but will press heavily on the surface of the journal type bearing as soon as the load is applied thereto.

It is a further object to make use of the elasticity of steel and other materials, and also of the shape of the bearing and the carrier itself to such an extent that under a fully applied load deformation of material will take place to such an extent as to transform parts of the journal bearing which are non-bearing while unloaded into substantial bearing parts while under the pressure of an applied load.

It is also an object to provide a combination bearing structure whereby the geometrical arrangement of the balls is such in relation to the position of the journal bearing that wear on the ball race and balls by deformation or by abrasive action will be proportional to the wear on the surface of the journal bearing, also due to the deformation or abrasive action, so that the proportion of load carried by the ball bearings, after a considerable amount of wear on the whole assembly, is substantially the same as it was originally in the new assembly.

It is a further object of my invention to choose the angles between the ball races and the axis of the journal bearing in such a way that this uniformity of load distribution can be maintained even if the ball race and balls wear only a fraction of the amount which takes place on the surface of the journal bearing.

It is another object of my invention to provide a combination journal type and ball type bearing having materials of such hardness and physical characteristics that will, as far as possible, prevent undue wear, but which will allow wear necessary in order to maintain the proper load distribution.

This has been accomplished in my improved bearing structure by providing a central cylindrical section forming a journal bearing for the carrier to take the main portion of the load. At each end of the cylindrical section is a tapered flange which has an annular ball-receiving groove. The carrier has a pair of similarly positioned ball-receiving grooves that cooperate with the flange grooves to form a ball bearing at each end of the journal, the ball bearings taking the remainder of the load. The ball grooves are so arranged that one contact with each set of balls is on a surface inclined to the bearing axis so that the carrier is not only held aligned but the ball race readily adapts itself to wear in the journal bearing.

How the above and other objects of my invention are accomplished will be better understood by reference to the following description and annexed drawing, in which.

Figure 1:
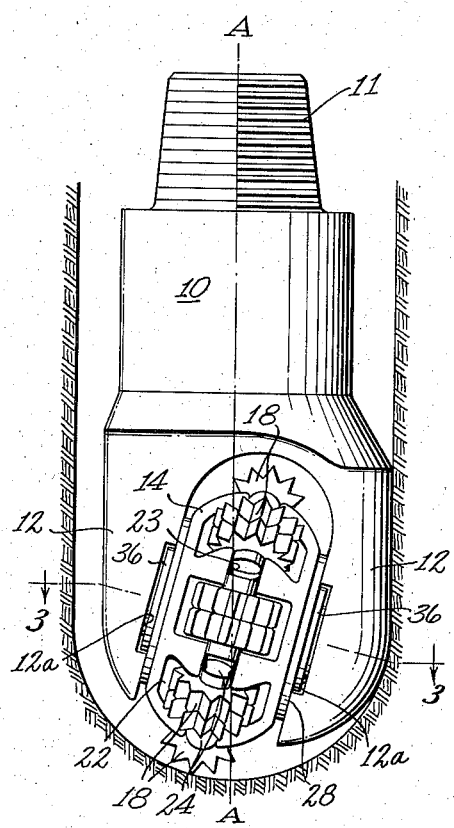
Fig. 1 is a side elevation of a drill bit with a bearing made in accordance with my invention.

There is shown in Fig. 1 a drill bit provided with a shank, generally indicated at 10, having on its upper end a threaded pin 11 by means of which the shank is attached to a drill stem for rotation about its longitudinal axis A—A, which is normally vertical or generally so. The lower portion of shank 10 is formed with two spaced depending legs 12 which carry between them cutter carrier 14 that is mounted to rotate about its axis B—B, axis B—B being preferably inclined as shown for the reasons set out in my above-mentioned copending application. About the periphery of the cutter carrier is rotatably mounted a plurality of rolling cutters 18 which are successively and intermittently brought into cutting engagement with the formation as the carrier is rotated about its axis. Cutters 18 are cleaned of adhering cuttings by a stream of circulation fluid issuing through nozzle 19 from the fluid passage within shank 10.

Cutter carrier 14 comprises a generally circular wheel-like body formed with a plurality of slots 22 extending radially inward from the carrier periphery. On each side of slots 22 are formed smaller notches 23. In each of slots 22 is mounted one or two cutters 18 upon an axle pin 24 which is seated at each end in a notch 23, then secured in place by any suitable means as by welding. Axle pins 24 are mounted tangentially of the carrier so that the axes of the cutters 18 are perpendicular to the carrier axis. Although cutters 18 may be of any suitable size or shape, they are here shown as substantially cylindrical rollers with cutting teeth about their periphery. The invention is not limited to a cutter carrier with movable cutters since the bearing may be used equally well in connection with a carrier having fixed cutting elements, as for example, a large disc with teeth around its periphery.

The bearing structure provided for rotatably mounting the carrier between the shank legs comprises a central member 26 which is internally threaded and has externally a cylindrical surface that forms a journal bearing for carrier 14. At each end of cylinder 26 is a flanged member 28 having a threaded pin that is screwed into the adjacent end of the central member. Each flange 28 is inclined upwardly and outwardly from th central member of the bearing structure and has an annular ball receiving groove 29 in this inclined portion so that the diameter of groove 29 about bearing axis B—B is greater than the diameter of member 26.

Figure 2:
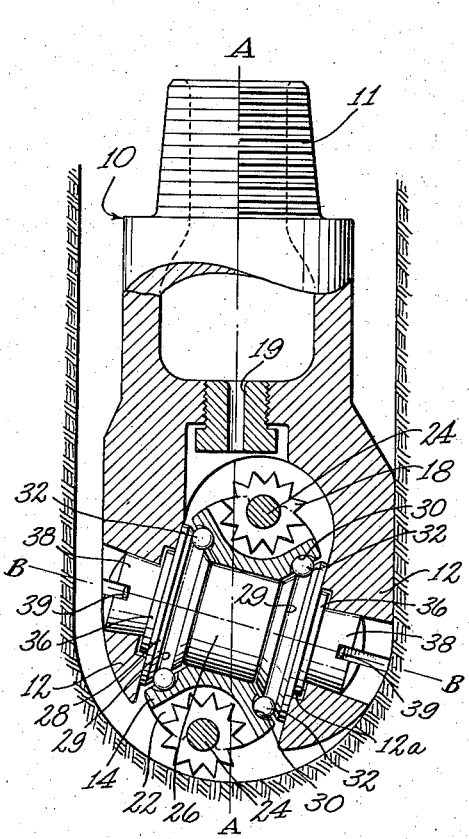
Fig. 2 is a vertical median section through the bit of Fig. 1, with the bearing structure shown in elevation.
Figure 3:
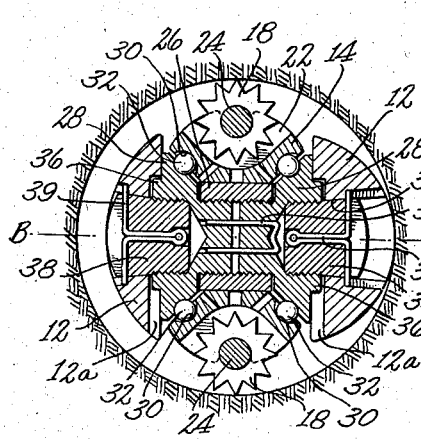
Fig. 3 is a horizontal section on line 3—3 of Fig. 1.

As will be noticed from Figs. 2 and 3, the internal surfaces of carrier 14 are complementary to the external surfaces of the bearing structure upon which the carrier is mounted. Thus the carrier has a central cylindrical bearing portion journalled upon member 26 and at each side of this central bore has an outwardly inclined face in which there is a ball-receiving groove 30. The two grooves 30 in the carrier cooperate with the two grooves 29 in the flanges to form annular channels which hold a number of balls 32 to form a bearing at each end of the journal bearing.

When a carrier is mounted upon an assembled bearing structure, the two flange members are screwed up tightly in sleeve 26 so that the endwise pressure of the flanges on balls 32 holds carrier 14 supported by the ball bearings. The two flange members are then locked against relative rotation by a U-shaped locking pin 33 passing through aligned apertures in the two flange members. Pin 33 is placed in these apertures by inserting it through bore 34 which opens to the outside face of flange 28. When thus assembled, the carrier and bearing are ready to be slid sideways as a unit into the space between the shank legs 12. Each flange 28 has, on its outside face, a raised boss 36 flattened across the top and bottom sides and of a proper dimension to fill a horizontally extending slot 12ª recessed in the inner face of shank leg 12. The two slots 12ª open to the same side of shank legs 12 so that the assembled bearing may be slid horizontally into the two slots, and when in position, bosses 36 hold the bearing against rotation within the shank. The described assembly is secured in the shank by a pair of threaded taper pins 38 which are inserted one each through a tapered opening in the side of a shank leg 12 and screwed into internally threaded bores 34 in flanges 28. After pins 38 are tightened the desired amount, the ends of cotter keys 39, one of which has been previously inserted in each pin, are bent outwardly into notches in the shank leg to hold the taper pins against rotation.

The bearing structure comprises two main parts. One is the journal bearing afforded by the external surface of sleeve 26, and this bearing takes the major portion of the vertical load placed on the bit by drilling operations. The other part comprises the two ball type bearings formed by balls 32 held within grooves 29 and 30. These ball bearings take the remainder of the load. The end bearings not only hold the carrier centered on the journal bearing but also hold it accurately aligned within the hole, and because of the novel construction, are enabled to perform these functions efficiently regardless of the amount of wear on the bearing.

Grooves 29 are semi-circular in cross-section and are of substantially the same radius of curvature as balls 32 which seat in the groove and bear therein over the entire width of the groove. Because the greatest loads on the bearing are vertical, wear on grooves 29 is confined to the lower half of these stationary surfaces, with the major portion of the wear taking place within 45° each side of the vertical. Grooves 29 are designed to give a maximum resistance to this wear by providing a bearing for balls 32 over as much as possible of the groove width and also, preferably, by facing the groove with some particularly hard, wear-resistant metal which is applied by welding and then ground to produce the desired bearing surface.

Each groove 30 has a radius of curvature in cross-section greater than the radius of balls 32 and consequently is wider than twice its depth. Since carrier 14 rotates, the wear in grooves 30 is distributed around the groove rather than being concentrated. Grooves 30 are preferably not faced with a hard metal but are carburized and quenched to give a hard surface which is nevertheless somewhat softer than the facing on grooves 29.

Figure 4:
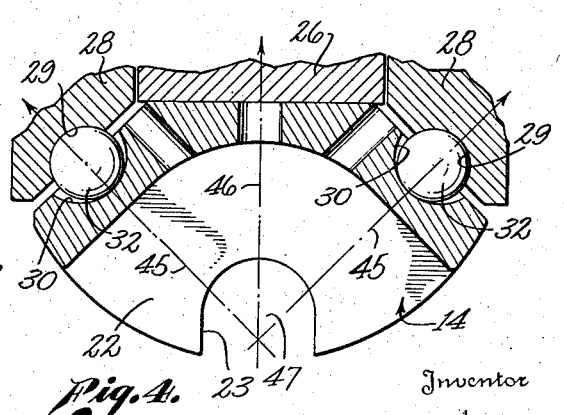
Fig. 4 is an enlarged fragmentary view showing the construction of the ball thrust bearings.

By this construction, the contact of the carrier with the balls is limited to a small part of the groove width and that part is at the center of groove 30, as is shown clearly in Fig. 4. The segment of groove 30 actually in contact with a ball 32 is so short that the effect is to limit the contact at one side of the balls to a surface inclined to the bearing axis, all this surface having substantially the same inclination but having the advantage over a plane surface that the area of contact is larger and hence the unit pressures are lower. If desired, this inclined surface may be placed on the flange or both carrier and flange may have it, but it is preferred to have it only on the carrier as shown.

The result obtained by this construction is that the wear on the wall groove can be controlled to such an extent that it approximates in effect the wear on the journal bearing, thus preventing the balls from taking too much of the radial load, even though the journal bearing normally becomes worn most. The groove 30 is less wear resistant than the other bearing surfaces, and so wears proportionately faster, a fact that partially offsets the inherent lack of wear in a ball type bearing where there is only rolling contact. Also, less metal need be removed. The pressure on the bearing is initially in the direction of arrow 45 (see Fig. 4), perpendicular to the center of the carrier surface in contact with the ball. Wear on the journal bearing moves the carrier in the direction of arrow 46, radially of the journal, but in order for the thrust bearing to allow equal movement of the carrier, the aggregate wear on the thrust bearing only equals the component of movement 46 in the direction 45, which varies as the cosine of angle 47. With a force angle of 45° as illustrated, the total wear on the ball bearing need be only .7 the wear on the journal to maintain all parts in the same relative positions as originally and maintain a constant distribution of loads between the journal and ball bearings. If the resultant of all the various factors is such that the two bearings do not wear in this proportion, angle 47 may be varied, so that more or less wear takes place on the ball bearing as needed to keep the desired load distribution.

Within the limits of wear normally encountered, the contacting surface in groove 30 will retain sufficient inclination for the carrier to bear against sleeve 26 and retain the original relation between the various parts. Vertical loads are applied to the carrier between the two end bearings which stabilize the carrier and, regardless of wear on the bearings, always fit snugly to hold the carrier in proper position throughout the life of the bearing assembly. Ample clearance is provided between the inclined surfaces of the carrier and flanges so that movements as described can take place.

As mentioned above, when the bearing is first assembled, flanges are drawn up tightly and the carrier is supported entirely, or nearly so, on the ball bearings. When vertical loads are imposed as shown by arrow 46, the load is taken principally by central sleeve 26 as a result of the shape and construction of the assembly and deformation of its parts.

It will be understood various changes and modifications in the embodiment of my invention can be made without departing from the spirit and scope of the invention, and all such changes are to be considered as included in the scope of the appended claims.

I claim as my invention:

1. In a well drilling tool, the combination of a shank having two spaced depending legs; a bearing structure mounted between said legs and comprising a central portion having a cylindrical surface and adapted to take the major portion of a load, and an outwardly inclined flange at each end of the cylindrical surface; a cutter carrier rotatably mounted on said bearing structure; and a plurality of ball bearings held between each flange and the carrier to transmit the remainder of a load to the bearing structure.

2. In a well drilling tool, the combination of a shank having two spaced depending legs; a bearing structure mounted between said legs and comprising a central cylindrical portion adapted to take the major portion of a load, and an outwardly inclined flange at each end of the cylindrical surface, each flange having an annular groove of a diameter about the bearing axis greater than the cylindrical portion; a cutter carrier rotatably mounted on said bearing structure, and having an annular groove opposite each of the flange grooves; and a plurality of ball bearings held by said grooves between each flange and the carrier to transmit the remainder of a load to the bearing structure.

3. In a well drilling tool, the combination of a shank having two spaced depending legs; a bearing structure mounted between said legs and comprising a central cylindrical portion adapted to take the major portion of a load, and a flange at each end of the cylindrical surface, each flange having an annular groove; a cutter carrier rotatably mounted on said bearing structure and having an annular groove opposite each of the bearing grooves; and a plurality of ball bearings held by said grooves between each flange and the carrier to transmit the remainder of a load to the bearing structure; said grooves being so shaped that the contact at one side of the balls held in a pair of said grooves is limited to a surface inclined to the bearing axis.

4. In a well drilling tool, the combination of a shank having two spaced depending legs; a bearing structure mounted between said legs and comprising a central cylindrical portion adapted to take the major portion of a load, and a flange at each end of the cylindrical surface, each flange having an annular groove; a cutter carrier rotatably mounted on said bearing structure and having an annular groove opposite each of the bearing grooves; and a plurality of ball bearings held by said grooves between each flange and the carrier to transmit the remainder of a load to the bearing structure; said carrier grooves being so shaped that the contact of the carrier with the balls held in a pair of said grooves is limited to a surface inclined to the bearing axis.

5. In a well drilling tool, the combination of a shank having two spaced depending legs; a bearing structure mounted between said legs and comprising a central cylindrical portion adapted to take the major portion of a load, and an outwardly inclined flange at each end of the cylindrical surface, each flange having an annular groove of semi-circular cross section; a cutter carrier rotatably mounted on said bearing structure, and having an annular groove opposite each of the bearing grooves, each said carrier groove being wider than twice its depth; and a plurality of ball bearings held by said grooves between each flange and the carrier to transmit the remainder of a load to the bearing structure.

6. A bearing structure for a rotatably mounted cutter carrier in an oil well drilling tool, comprising a sleeve having an external journal bearing surface, a flange at each end of the sleeve having an outwardly inclined surface with a ball-receiving groove cut therein, and means on each flange for mounting the assembled structure non-rotatably on a tool shank.

7. A bearing structure for a rotatably mounted cutter carrier in an oil well drilling tool, comprising a sleeve having an external journal bearing surface, a flange at each end of the sleeve having an outwardly inclined surface with a ball-receiving groove cut therein, and means on each flange for mounting the assembled structure non-rotatably on a tool shank, said means comprising a boss with two parallel sides and a threaded bore placed between the parallel sides of the boss.

8. A bearing structure for a rotatably mounted cutter carrier in an oil well drilling tool, comprising a sleeve having an external journal bearing surface, a detachable flanged member at each end of the sleeve having a ball-receiving groove cut therein of a diameter about the bearing axis greater than the diameter of the central sleeve, and means on each end flange for mounting the assembled structure non-rotatably on a tool shank.

9. As an article of manufacture, a bearing member comprising a flange portion having an annular ball receiving groove therein, a threaded pin projecting beyond one side of the flange, and an internally threaded bore extending into the bearing from the other side of the flange.

10. As an article of manufacture, a bearing member comprising a flange portion having an annular ball receiving groove therein, a threaded pin projecting beyond one side of the flange, an internally threaded bore extending into the bearing from the other side of the flange, and a raised boss on said other side of the flange having opposite sides flattened to hold the bearing against rotation when received in a stationary part of a tool.

11. A cutter carrier for a drill bit comprising a wheel-like body adapted to be rotatably mounted to revolve about a central axis, a central cylindrical bearing surface in said body, an outwardly inclined surface at each side of said cylindrical surface having an annular ball receiving groove, and a plurality of cutters rotatably mounted around the periphery of the carrier body.

12. A cutter carrier for a drill bit comprising a wheel-like body adapted to be rotatably mounted to revolve about a central axis, a central cylindrical bearing surface in said body, an outwardly inclined surface at each side of said cylindrical surface having an annular ball receiving groove, said groove having a sufficient radius of curvature in cross-section that its width is greater than twice its depth, and a plurality of cutters rotatably mounted around the periphery of the carrier body.

13. In a well drilling tool, the combination of a shank having two spaced depending legs; a bearing structure mounted between said legs and comprising a central portion having a cylindrical surface and adapted to take the major portion of a load, and an outwardly inclined flange at each end of the cylindrical surface; a cutter carrier rotatably mounted on said bearing structure, cutters rotatably mounted on said carrier; and rolling bodies between each flange and the carrier to transmit the remainder of a load to the bearing structure.

14. In a well drilling tool, the combination of a shank having two spaced depending legs; a bearing structure mounted between said legs and comprising a central portion having a cylindrical surface and adapted to take the major portion of a load, and a flange at each end of the cylindrical surface; a cutter carrier rotatably mounted on said bearing structure, cutters rotatably mounted on said carrier; and rolling bodies between each flange and the carrier to transmit the remainder of a load to the bearing structure.

JOHN A. ZUBLIN.